MAGNETIC CORE DIGITAL STORAGE AND TRANSFER CIRCUITS

Filed May 3, 1960 2 Sheets-Sheet 1

INVENTOR.
LESTER MINTZER
BY Henry L. Hanson
ATTORNEY

INVENTOR.
LESTER MINTZER

BY *Henry L. Hanson*

ATTORNEY 3,097,306

MAGNETIC CORE DIGITAL STORAGE AND TRANSFER CIRCUITS

Lester Mintzer, Newton Center, Mass., assignor to Minneapolis-Honeywell Regulator Company, Minneapolis, Minn., a corporation of Delaware Filed May 3, 1960, Ser. No. 26,598
12 Claims. (Cl. 307—88)

A general object of the present invention is to provide a new and improved electrical apparatus for the manipulation of digital data. More specifically, the present invention is concerned with a new and improved electrical logical circuit embodying bistable magnetic core devices and diodes so interconnected that it is possible for the advantages of bistable magnetic core devices and diodes to be utilized in combined logical circuits to take optimum advantage of the best characteristics of the core devices and the diodes.

Magnetic core circuitry has been utilized heretofore for implementing certain types of logical functions in digital data processing circuitry. The magnetic cores used are generally those having bistable characteristics which can be switched by the application of switching currents thereto. The bistable characteristics may be used to define binary "ones" and "zeroes."

In utilizing magnetic core devices in logical circuitry, there are many important considerations that must be kept in mind in connection with signal levels, power levels, noise levels and the like in establishing the parameters and limits to which the magnetic core circuits can be used directly for implementing digital logic. As the complexity of the logic is extended and the number of functions combined in a particular logical circuit is increased, the circuit parameters and the parameters of the core devices, per se, become more critical and, in some instances, the magnetic core devices have to be hand-picked for selected characteristics in order to build selected types of apparatus. Even in this instance, however, the circuit limitations are such that the logic to be performed by a particular combination must be limited.

Representative logical circuitry using magnetic core logic will be found in the Ruhman Patent 2,852,699, issued September 16, 1958. While this type of circuitry, as disclosed in the Ruhman patent, will operate very effectively in many types of circuit configurations, the foregoing limitations tend to restrict the possible combinations that can be realized in any one particular circuit.

In accordance with the teachings of the present invention there has been provided a digital data circuit manipulator using magnetic core devices for digital storage and transfer purposes in combination with diode logic. The circuitry is so arranged that the outputs of a particular magnetic core device of the circuit are utilized solely for establishing voltage levels in the circuit and the amount of power output from a particular magnetic core device is not critical in the controlling of the setting of subsequent core devices in the circuitry.

It is accordingly a further more specific object of the invention to provide an improved magnetic core-diode logical circuit using magnetic core input signals and magnetic core outputs in combination with diode logic coupled between the input and output magnetic core devices.

Another more specific object of the invention is to provide a new and improved magnetic core circuit wherein output signals from the magnetic core circuit may be used to establish a signal level in a storage device on the output of the magnetic core device and thereby control the biasing of the diode network connected thereto so that a timing or clock signal may be selectively gated in one direction or another to control selectively the setting of a subsequent magnetic core device.

In implementing the foregoing object, the magnetic cores used on the input may be used to selectively establish a charge on a condenser connected on the output circuit of the core device. The charge on the condenser may then in turn be used to control the biasing of a diode network which has a timing or clock signal applied thereto. The clock signal applied to this diode network will be arranged to flow either into the condenser of the network or into the input winding of a further magnetic core, depending upon whether or not there has previously been established a charge on the condenser. In this way, it is possible to utilize the clock source in such a manner that the power required for setting ouput cores may be derived from the clock source rather than from the preceding magnetic core devices of the circuit. This means that a number of core devices may be controlled in the output circuit without unduly loading the input magnetic core devices.

It is accordingly a further object of the invention to provide a new and improved magnetic core logical circuit having a clock pulse source coupled to the connecting circuitry between the magnetic core devices to provide the necessary power for switching subsequent magnetic cores associated in the circuit in accordance with signals derived from the input magnetic cores.

The foregoing objects and features of novelty which characterize the invention, as well as other objects of the invention, are pointed out with particularly in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figures 1, 2:
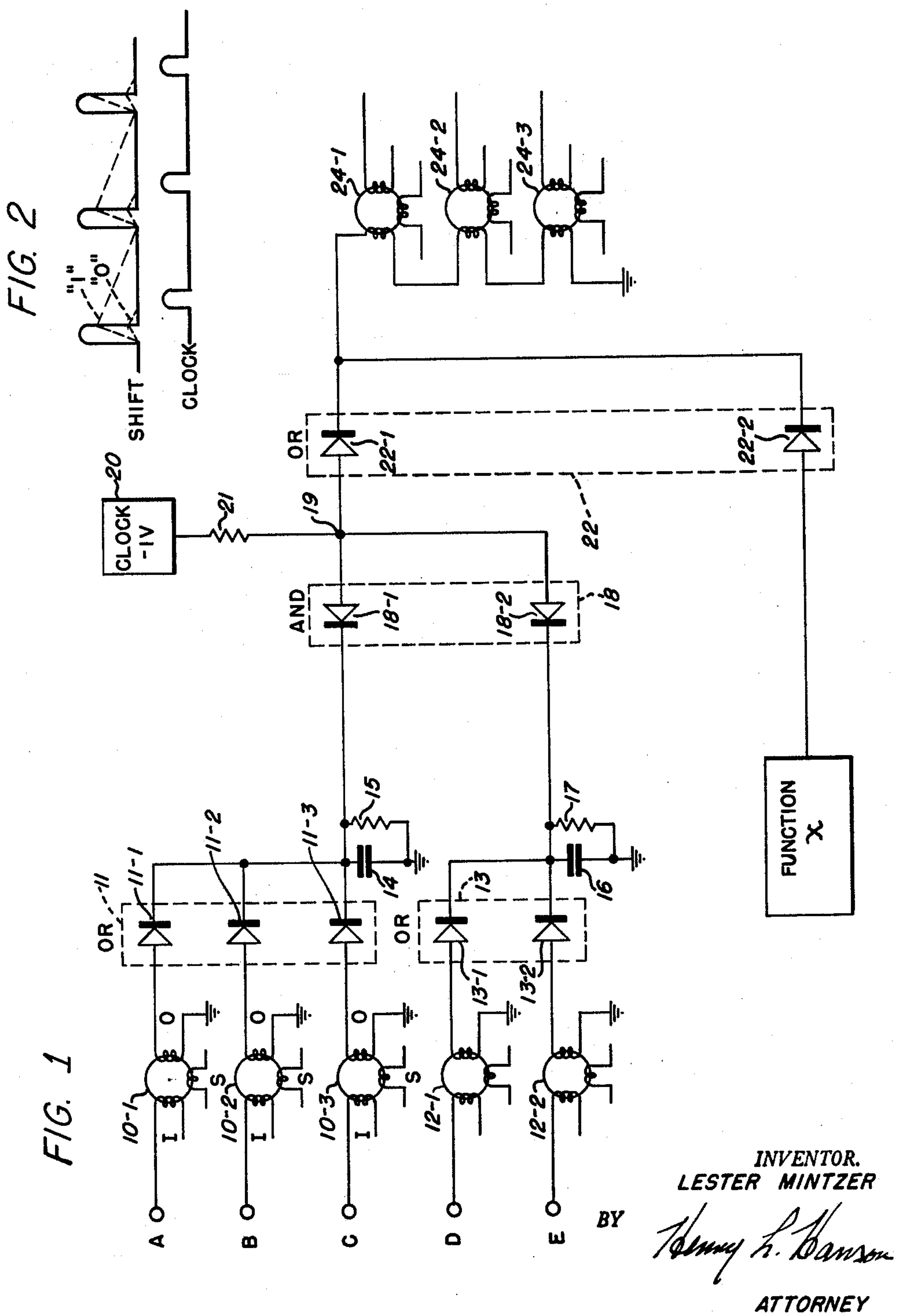
FIGURE 1 illustrates a preferred embodiment of the invention incorporating magnetic core input and output circuitry coupled together by diode logical circuitry.
FIGURE 2 illustrates timing signals associated with the circuitry of FIGURE 1.

Referring to FIGURE 1, the numerals 10–1, 10–2 and 10–3 identify three input magnetic core devices of the bistable type which are adapted to be set or reset in accordance with input signals applied to the input windings thereon. The input signals are adapted to be applied to the input terminals A, B and C, which are directly coupled to the input windings associated with the respective core devices 10–1 through 10–3. A shift winding S is associated with each of the core devices 10–1 through 10–3. The shift windings are all adapted to be energized by a common shift signal source, not shown. Each of the core devices 10–1 through 10–3 has an output winding O which is connected to the diode buffer or "OR" circuit 11 incorporating diodes 11–1, 11–2 and 11–3 arranged in FIGURE 1 with their cathodes connected to a common terminal and their anodes connected to the output windings of the respective core devices 10–1, 10–2 and 10–3.

An additional pair of input magnetic circuits are provided by way of the core devices 12–1 and 12–2, each of which has an input winding, an output winding and a shift winding. The output windings of the core devices 12–1 and 12–2 are coupled to a further buffering or "OR" circuit 13 which has a pair of diodes 13–1 and 13–2 associated therewith. These diodes are connected similarly to those in the buffering circuit 11 with the cathodes of the diodes being connected together, and with the anodes connected to the output windings of the associated core devices 12–1 and 12–2.

The output of the buffering circuit 11 is coupled to a condenser 14 having a resistor 15 in parallel therewith. The output of the buffer 13 is coupled to a condenser 16 having a resistor 17 in parallel therewith. The two condensers 14 and 16 are coupled by way of a diode "AND" circuit 18 to a circuit junction 19. The "AND" circuit 18 incorporates a diode 18–1 and a further diode 18–2. Also coupled to the junction terminal 19 is a clock pulse source 20, with a coupling circuit including a resistor 21.

The terminal 19 is coupled to a plurality of output magnetic core devices by way of a further buffering or "OR" circuit 22 which includes a pair of diodes 22–1 and 22–2. The buffer circuit is coupled to the output magnetic core devices which are indicated as being core devices 24–1, 24–2 and 24–3. These core devices are arranged each with an input winding, an output winding, and a shift winding. As illustrated, all of the input windings of the core devices 24–1 through 24–3 are connected in series.

In considering the operation of the apparatus as illustrated in FIGURE 1, it is first assumed that an input signal has been applied to the input terminal A, such as to switch the bistable magnetic core device 10–1 into a set state to thereby indicate that a "one" has been written into the magnetic core device. Following the writing in of a "one" in this core device 10–1, a shift signal is applied thereto by way of the shift winding S. The shift signal will switch the core device from the "one" state back to the "zero" state and, in so switching, a signal will be induced in the output winding O, and this will be coupled by way of the diode 11–1 to charge the condenser 14. The charging of the condenser 14 will be effective to establish a back-bias on the diode 18–1. When the clock pulse is applied from the clock source 20 to the junction 19, the back-bias existing on the diode 18-1 will prevent the clock pulse from passing into the condenser 14 by way of the diode 18–1. Consequently, the clock pulse will go through the diode 18–2 into the condenser 16 unless the condenser 16 has been charged in a manner similar to the charging of the condenser 14 by way of one or the other of the core devices 12–1 or 12–2. Assuming that both of the core devices 18–1 and 18–2 are back-biased by way of charges on the condensers 14 and 16, the clock pulse will be directed through the diode 22–1 in the buffer circuit 22 into the input windings of each of the cores 24–1, 24–2 and 24–3. With the application of the clock pulse to these input windings on the output cores 24, these cores will all be switched to a set state, or to a "one" state, indicating that a "one" has been transferred through the coupling logical circuitry.

The relationship of the shift pulses and clock pulses utilized in FIGURE 1 are illustrated in FIGURE 2. It will be noted that the shift pulse occurs first in time and, if the core has been set by way of a previous input signal, the output signal from the core will tend to follow the dotted line "numeral 1." This output will be represented in the charge stored in the condenser 14, and this charge will tend to be held until about the time that the next shift pulse occurs. The holding or discharging is controlled by the resistor connected in parallel with the condenser.

The clock pulse will be seen to be phased to occur slightly after the shift pulse has occurred. The clock pulse is delayed sufficiently so that in the event that there should be a "zero" shifting signal produced in the output of one or more of the cores, this "zero" signal will have been dissipated in the R-C network on the output before the clock pulse does appear. This will ensure that there will not be a false reading of a clock pulse into the cores on the output from a "zero" shift signal.

As illustrated in FIGURE 1, the diode logic incorporated between the input cores 10 and 12 and the output cores 24 may be termed buffer-gate-buffer logic. Thus, if any one of the input functions A, B or C is present to set the cores 101 through 10–3 respectively, the shifting of the core which has been set will be effective to establish the essential charge on the condenser 14 required for back-biasing the diode 18–1. The diode 18–1, when back-biased, will obviously not be able to conduct upon the application of the clock pulse. With a similar buffer circuit 13 related to the input cores 12–1 and 12–2, these two buffer circuits then combine by way of the gating or "AND" circuit 18. The signals on the output of the "AND" circuit 18 may then be combined with a further buffer circuit 22 wherein the additional diode 22–2 has associated therewith an input indicated by the function X, which may also take the form of a logical network leading up to the terminal 19. Thus, the control clock pulse originating in the terminal 19 or from function X may be used to set the output cores 24.

Figure 4:
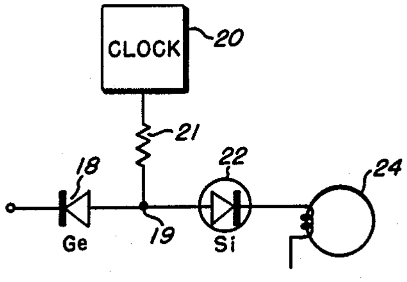
FIGURE 4 illustrates a modification for providing signal discrimination.

In the foregoing description, it has been assumed that the diodes 18–1 and 22–1 are balanced diodes and that upon the application of a clock pulse the current would tend to flow into the condenser 14 in the absence of a back-biasing voltage existing on the diode 18–1. In actual fact, however, the current flow in the circuit of FIGURE 1 will tend to divide equally between the diodes 18–1 and 22–1. This will not be objectionable so long as the current levels flowing through the diode 22–1 are not sufficient to switch the output core devices 24. In order to limit this current flow condition under a "zero" signal condition, the diode 22–1 may be selected to be a silicon diode where the threshold of conduction in the diode is higher than the diode 18. Such a circuit is illustrated in FIGURE 4. If the diode 18 is a germanium diode, its threshold of conduction is approximately .25 volt, while the threshold of conduction for a silicon diode is approximately .5 volt. The effect of this will be to have all of the clock pulse energy go into the condenser 14 through the diode 18–1 in the absence of a charge on the condenser 14 from the core 10.

Figure 5:
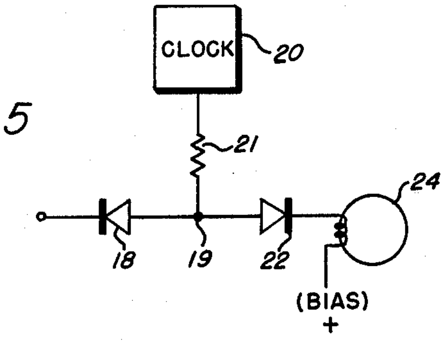
FIGURE 5 illustrates a further modification along the lines of the circuit of FIGURE 4.

A similar limiting effect may be achieved using like types of diodes for the diodes 18–1 and 22–1 by providing a fixed bias on the diode 22 in the manner indicated in FIGURE 5. Thus, the diodes 18 and 22, as illustrated in FIGURE 5, may be both germanium diodes or silicon diodes. The net effect is the same in either of FIGURES 4 or 5 in that a "zero" signal indicated at the terminal 19 will result in the clock pulse being directed through the diode 18 into the associated storage condenser.

Figure 3:
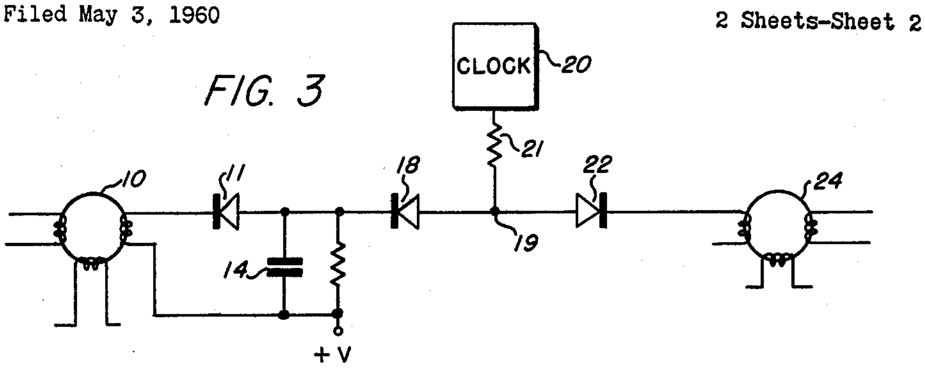
FIGURE 3 illustrates a modified embodiment of the invention.

The modification illustrated in FIGURE 3 permits the circuitry to function with an inhibit logic such that a "one" originating from the core 10 may be used to prevent the clock pulse signal from being read into the core 24 in the manner indicated in connection with FIGURE 1. The essential difference between FIGURE 1 and FIGURE 3 is that the diode 11 has been reversed in polarity in the circuit and the condenser 14 is shown connected to a positive voltage source +V. In addition, the output winding on the core device 10 will be reversed in polarity from the output as illustrated in FIGURE 1.

In operation, the circuitry of FIGURE 3 is arranged to be set by an input signal to the core 10. When the core 10 has been set, the application and the subsequent shift pulse applied to the shift winding will result in a signal being applied to the condenser 14 so as to charge the condenser 14 negative on the output terminal. This negative potential will be sufficient to overcome the positive bias from the +V biasing source so that the diode 18 will be able to conduct upon the application of the clock pulse. In the event that the diode 18 is biased in its conductive region, the clock pulse will be effective to pass through diode 18 into the condenser 14 and not into the input winding of the core 24.

It will be readily apparent that the modifications incorporated in FIGURE 4 and FIGURE 5 may be utilized in FIGURE 3 equally as well as with FIGURE 1.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A coupling circuit for a digital transfer circuit comprising a pair of bistable magnetic core devices each of which has an input winding, an output winding and a shift winding, a condenser connected in series with the output winding of one of said bistable magnetic core devices, a pair of diodes having two like electrodes connected together and their other like electrodes connected one each to said condenser and to the input winding of the other of said core devices, and a clock pulse source connected to said pair of diodes where the like electrodes are connected together.

2. A coupling circuit for a digital transfer circuit comprising a pair of bistable magnetic core devices each of which has an input winding, an output winding and a shift winding, a first diode, a condenser connected by said first diode in series with the output winding of one of said bistable magnetic core devices, a resistor connected in parallel with said condenser, a pair of diodes having two like electrodes connected together and their other like electrodes connected one each to said condenser and to the input winding of the other of said core devices, and a clock pulse source connected to said pair of diodes where the like electrodes are connected together.

3. A coupling circuit for a digital transfer circuit comprising a pair of bistable magnetic core devices each of which has an input winding, an output winding and a shift winding, a condenser connected in series with the output winding of one of said bistable magnetic core devices, a pair of diodes having two like electrodes connected together and their other like electrodes connected one each to said condenser and to the input winding of the other of said core devices, a clock pulse source connected to said pair of diodes where the like electrodes are connected together, and a shift pulse source connected to said shift windings, said clock pulse source being phased to operate at a time after said shift pulse source.

4. A digital logical circuit comprising a plurality of input bistable magnetic core devices each of which has an input winding, an output winding and a shift winding, a condenser, diode means coupling the output winding of each of said core devices to said condenser, a pair of diodes having two like electrodes connected together at a common junction, means connecting one of the other of the electrodes of one of said diodes to said condenser, means connecting the other electrode of the other of said diodes to an output circuit, and a pulse signal source connected to said junction.

5. A digital logical circuit comprising a plurality of input bistable magnetic core devices each of which has an input winding, an output winding and a shift winding, a condenser, a plurality of diodes connected one each to couple the output winding of each of said core devices to said condenser, a pair of diodes having two like electrodes connected together at a common junction, means connecting one of the other of the electrodes of one of said diodes to said condenser, means connecting the other electrode of the other of said diodes to an output circuit, and a pulse signal source connected to said junction.

6. A digital logical circuit comprising a plurality of input bistable magnetic core devices each of which has an input winding, an output winding and a shift winding, a condenser, diode means coupling the output winding of each of said core devices to said condenser, a pair of diodes having two like electrodes connected together at a common junction, means connecting one of the other of the electrodes of one of said diodes to said condenser, means connecting the other electrode of the other of said diodes to an output circuit, a shift pulse source having output pulses of a first phase, means connecting said shift pulse source to each of said magnetic core devices, and a clock pulse source, said clock pulse source being connected to said common junction and having a time phase delayed from said shift pulse source.

7. A logical circuit for digital data processing comprising a first plurality of input bistable magnetic core devices, a first condenser, a first diode "OR" gate means coupling said first core devices to said first condenser, a second plurality of input bistable magnetic core devices, a second condenser, a second diode "OR" circuit means coupling said second core devices to said second condenser, a first diode "AND" circuit means connecting said first and second condensers to a clock pulse terminal, and means connecting said clock pulse terminal to an output circuit.

8. A logical circuit for digital data signals comprising a first plurality of input bistable magnetic core devices, a first condenser, a first diode "OR" gate means coupling said first core devices to said first condenser, a second plurality of input bistable magnetic core devices, a second condenser, a second diode "OR" circuit means coupling said second core devices to said second condenser, a first diode "AND" circuit means connecting said first and second condensers to a clock pulse terminal, means connecting said clock pulse terminal to an output circuit, and a shift pulse source connected to said magnetic core devices, said shift pulse source having a time phase in advance of clock pulses applied to said clock pulse terminal.

9. A logical circuit for digital data comprising a first plurality of input bistable magnetic core devices, a first condenser, a first diode "OR" gate means coupling said first core devices to said first condenser, a second plurality of input bistable magnetic core devices, a second condenser, a second diode "OR" circiut means coupling said second core devices to said second condenser, a first diode "AND" circuit means connecting said first and second condensers to a clock pulse terminal, and a buffer diode means connecting said clock pulse terminal to an output magnetic core device.

10. A digital circuit comprising first and second magnetic core devices, each of said devices having input, output and shift windings, a condenser, a first diode coupling the output winding of said first device to said condenser, a clock pulse terminal, a second diode coupled between said condenser and said terminal and polarized in the same direction as said first diode, a third diode coupling said terminal to the input winding of said second device, and a biasing potential source connected to said condenser.

11. A digital circuit comprising first and second magnetic core devices, each of said devices having input, output and shift windings, a condenser, a first diode coupling the output winding of said first device to said condenser, a clock pulse terminal, a second diode coupled between said condenser and said terminal and polarized in the same direction as said first diode, a third diode coupling said terminal to the input winding of said second device, a biasing potential source connected to said condenser, and a shift pulse source coupled to the shift windings of said first and second core devices, said shift pulse source having a pulse phased in advance of the pulses of said clock pulse terminal.

12. A digital circuit comprising first and second magnetic core devices, each of said devices having input, output and shift windings, a condenser, a first diode coupling the output winding of said first device to said condenser, a clock pulse terminal, a second diode coupled between said condenser and said terminal and polarized in the same direction as said first diode, a third diode coupling said terminal to the input winding of said second device and polarized in a direction opposite that of said first and second diodes, and a biasing potential source connected to said condenser.

References Cited in the file of this patent

UNITED STATES PATENTS

| | | |
|---|---|---|
| 2,712,065 | Elbourn et al. | June 28, 1955 |
| 2,852,699 | Ruhman | Sept. 16, 1958 |